United States Patent
Davis

(10) Patent No.: US 8,143,855 B2
(45) Date of Patent: Mar. 27, 2012

(54) RECHARGEABLE SPLIT BATTERY SYSTEM

(75) Inventor: Kerry Davis, San Jose, CA (US)

(73) Assignee: Atieva, Inc., Redwood City, CA (US)

( * ) Notice: Subject to any disclaimer, the term of this patent is extended or adjusted under 35 U.S.C. 154(b) by 337 days.

(21) Appl. No.: 12/372,714

(22) Filed: Feb. 17, 2009

(65) Prior Publication Data

US 2009/0218989 A1    Sep. 3, 2009

Related U.S. Application Data

(60) Provisional application No. 61/029,296, filed on Feb. 15, 2008.

(51) Int. Cl.
*H02J 7/00* (2006.01)

(52) U.S. Cl. ........ 320/126; 320/116; 320/118; 320/124; 320/127; 320/128

(58) Field of Classification Search ................ 320/116, 320/118, 124, 126, 127, 128
See application file for complete search history.

(56) References Cited

U.S. PATENT DOCUMENTS

| | | | | |
|---|---|---|---|---|
| 4,017,779 | A | * | 4/1977 | McDonald et al. ........... 320/126 |
| 4,181,842 | A | | 1/1980 | Elias et al. |
| 4,698,578 | A | | 10/1987 | Mullersman et al. |
| 4,709,202 | A | | 11/1987 | Koenck et al. |
| 4,812,672 | A | | 3/1989 | Cowan et al. |
| 4,814,631 | A | | 3/1989 | Jackson |
| 4,818,928 | A | * | 4/1989 | Schosser ...................... 320/112 |
| 5,300,874 | A | | 4/1994 | Shimamoto et al. |
| 5,461,264 | A | | 10/1995 | Yang |
| 5,483,433 | A | | 1/1996 | Yang |
| 5,717,310 | A | | 2/1998 | Sakai et al. |
| 5,796,224 | A | | 8/1998 | Hayashi et al. |
| 5,814,972 | A | | 9/1998 | Shimada et al. |
| 5,883,496 | A | * | 3/1999 | Esaki et al. |
| 6,084,382 | A | * | 7/2000 | Hite .............................. 320/116 |
| 6,268,711 | B1 | * | 7/2001 | Bearfield ...................... 320/117 |
| 6,674,180 | B2 | | 1/2004 | Gale et al. |
| 6,828,758 | B2 | * | 12/2004 | Ishishita ....................... 320/116 |
| 6,919,707 | B2 | * | 7/2005 | Kawai et al. .................. 320/117 |
| 6,930,404 | B1 | | 8/2005 | Gale et al. |
| 7,199,489 | B2 | | 4/2007 | Gottlieb et al. |
| 2005/0194931 | A1 | * | 9/2005 | Sobue et al. .................. 320/116 |
| 2006/0006840 | A1 | * | 1/2006 | Furukawa ...................... 320/116 |
| 2008/0048608 | A1 | * | 2/2008 | Lim et al. ...................... 320/106 |

FOREIGN PATENT DOCUMENTS

| | | |
|---|---|---|
| JP | 08251714 AL | 9/1996 |
| JP | 15226207 A | 12/2003 |

OTHER PUBLICATIONS

International Search Report and Written Opinion of the International Searching Authority regarding PCT Application PCT/US2009/040290, Oct. 13, 2009, 11 pages.

* cited by examiner

*Primary Examiner* — Patrick Assouad
*Assistant Examiner* — Steve T Chung
(74) *Attorney, Agent, or Firm* — Charles Shemwell

(57) ABSTRACT

A battery system is split into first and second battery subsystems. When the first battery subsystem reaches a first discharge level, the first battery system is decoupled from output terminals of the battery system and the second battery subsystem is coupled to the output terminals of the battery system.

14 Claims, 4 Drawing Sheets

RECHARGEABLE SPLIT BATTERY SYSTEM

CROSS-REFERENCE TO RELATED APPLICATIONS

This application claims priority to, and hereby incorporates by reference, U.S. Provisional Application No. 61/029,296, filed on Feb. 15, 2008.

FIELD OF THE INVENTION

The present invention relates to rechargeable battery systems.

BACKGROUND

The life of a rechargeable battery system in a single discharge cycle is difficult to predict because it is affected by many factors. Age, operating temperature, discharge conditions, and battery chemistry are some of the major factors. Though voltage monitoring is the easiest and most commonly used method of determining a rechargeable battery's remaining capacity in a single discharge cycle, different battery chemistries provide different voltage curves under different conditions. FIG. 1 shows two typical voltage curves of a lithium-ion rechargeable battery under different operating conditions. The solid line is a voltage curve under an optimal operating condition, i.e., lower discharge rate, higher operating temperature, and a newer cell. The dashed line is a voltage curve under a worse operating condition, i.e., higher discharge rate, lower operating temperature, and an older cell. As can be seen, in both curves, the voltage is relatively constant during the useful life of a battery's single discharge cycle; it drops off rather suddenly at the end of the cycle.

Since the voltage drop is small just prior to system failure 103, it is difficult to predict where the actual point of failure will be during a discharge cycle. Therefore, a battery system may either be cut off too soon or fail unexpectedly. The latter may result in inconvenient or serious consequences. For example, in a computer device, an unexpected battery failure may result in loss of important data; in an electric vehicle, a motorist may be stranded; and in a medical device, it could be a matter of life and death.

BRIEF DESCRIPTION OF THE DRAWINGS

The present invention is illustrated by way of example, and not limitation, in the figures of the accompanying drawings and in which like reference numerals refer to similar elements and in which.

DETAILED DESCRIPTION

Figure 1:
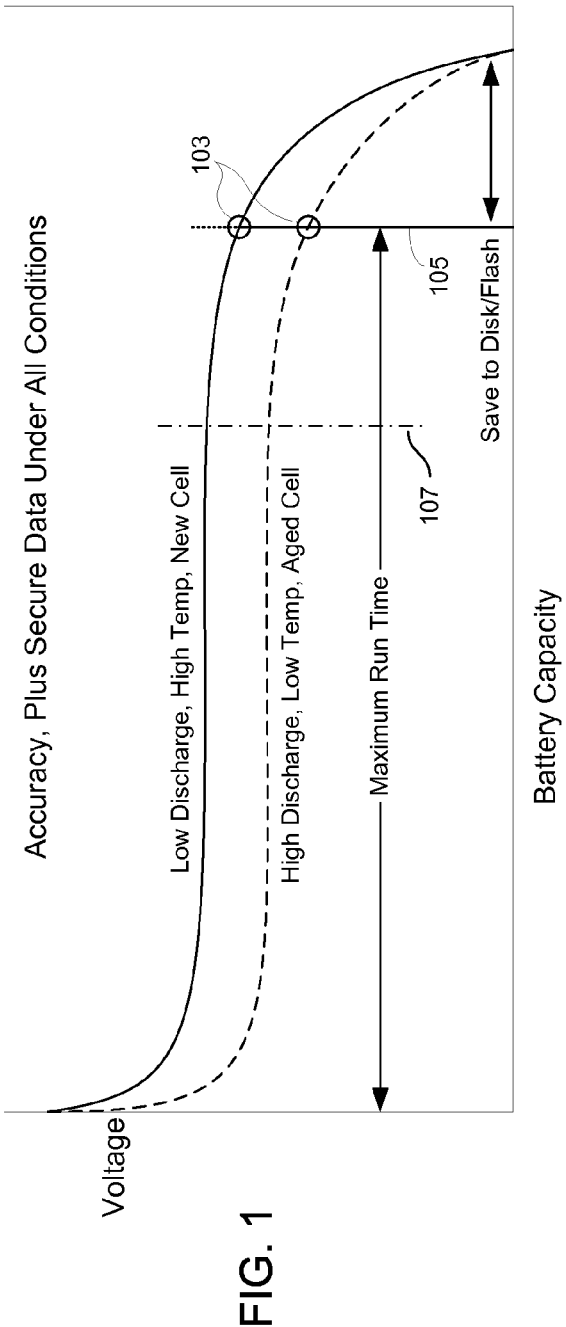
FIG. 1 shows typical voltage curves of a lithium-ion rechargeable battery under different operating conditions.

In embodiments disclosed herein, a rechargeable battery system is split into two or more battery subsystems which may be applied one after another to deliver power to a load. In a first embodiment, an operating battery subsystem is applied to deliver power until it reaches a predetermined or dynamically determined discharge point, and then a controlled-shutdown battery system is applied to deliver reserve power. Applying the two battery subsystems in succession takes much of the guesswork out of predicting the available operating time of the overall battery system by providing a definite end of life milestone near the end of the battery systems' true single charge operating cycle while at the same time making the overall end of life of the battery system much more predictable. As discussed, improved calibration statistics (e.g., for determining battery wear) may also be obtained as the split battery system creates an environment in which battery cells are charged and discharged to more constant and deterministic voltages. To restate, at least the following advantages may be achieved:
- much more predictable fuel gauge for rechargeable batteries, especially at the end of life of the battery system where it is most critical;
- enable estimation of true battery operating life and calibration of battery charging; and
- ensure a safe predictable controlled-shutdown period prior to complete battery system shutdown.

In a second embodiment, the rechargeable battery system is split into multiple battery systems that may be applied in succession to power the load (cascading from one subsystem to the next until all subsystems have been depleted) or ganged to deliver a level of power that exceeds the capability of one battery subsystem alone.

In general, the embodiments herein enable more accurate prediction of the end of battery system life in a single charge cycle by splitting the battery into two or more separate battery systems which can be switched in and out as needed. In the first embodiment, the first (operating) battery system is the main power delivery battery and is therefore much larger than the second battery system (i.e., the controlled-shutdown battery subsystem). The second battery system provides a backup to the first battery system and only takes over at the point the first battery system fails or crosses a predefined low voltage threshold. A good analogy is given in the diagram of FIG. 1 where the first battery system takes the device to the Maximum Run Time vertical line 105 and the second battery system switches in only when the first system reaches that point to save the operating state to Disk/Flash, or other action appropriate to the battery system application. The specific action to be taken upon reaching the maximum run time may be made more general by thinking of the left hand side as an operating state and the right hand side as a controlled-shutdown state. System designers may gauge the battery size of the operating-state battery subsystem (system 1) versus the controlled-shutdown battery subsystem (system 2) based on the needs of the worst case controlled-shutdown period. In terms of a high voltage electric vehicle or hybrid vehicle, this may be, for example, the point where the vehicle could switch over to the system 2 battery to provide sufficient reserve power to get the vehicle safely back to a recharging station without stranding the vehicle operator. In the second embodiment, the ability to apply battery subsystems either individually (and thus successively) or ganged in response to increased power demand provides the benefits of both configurations as conditions require.

Figure 2:
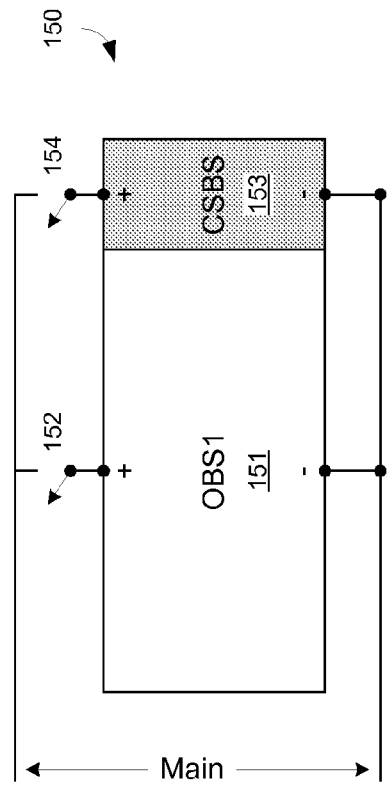
FIG. 2 shows one embodiment of a split rechargeable-battery system that includes two rechargeable battery subsystems.

FIG. 2 shows one embodiment of a split rechargeable-battery system 150 that includes two rechargeable battery subsystems: an operating battery system 151 (OBS), and a controlled-shutdown battery system 153 (CSBS). The OBS is the main operating subsystem and is therefore much larger than the CSBS. As an example, in one embodiment, the OBS provides 90% of the total system battery capacity, and the CSBS provides a 10% reserve. When the OBS reaches end of life in a discharge cycle, the OBS is switchably decoupled from the "Main" output terminals via switch(es) 152 (and thus decoupled from the load), and the CSBS is switchably coupled to the output terminals via switch(es) 154 in an operation referred to herein as a "switch-over." A switch-over point is indicated, for example, by vertical line 105 in FIG. 1, which marks, for example, the "maximum run time" for the OBS. Because the estimation of a battery's remaining capacity is generally more accurate at the beginning of a discharge cycle than near the end, the CSBS enables the host system (i.e., electric vehicle, industrial load, battery-powered medical device, computer, etc.) to safely perform a controlled-shutdown after the switch-over occurs. For example, in a computer system, data can be saved during the controlled-shutdown period; in an electric vehicle, a motorist can drive to a nearby recharging station, or a medical device operator may be alerted to the low power condition with confidence that a dependable level of power remains to conclude any critical activities. The relative sizes of OBS and CSBS may be determined by the needs of the worst case controlled-shutdown period and/or by maximum power requirements under normal operating conditions when the OBS is driving the load. Also, the OBS and CSBS may be included within a single battery pack or within separate battery packs, and may include battery cells having the same or different battery chemistries and/or form-factors.

A number of different techniques may be employed to trigger switch-over from the OBS to the CSBS. For example, in one embodiment, a pre-defined voltage threshold may be designed or programmed within a battery monitoring system and used as a pass/fail threshold for the voltages of individual cells or groups of cells within the split battery system. Upon detecting that the minimum cell or cell-group voltage falls below the threshold (or that a statistical representative of the voltage of all or a subset of the cells or cell-groups, such as an average or median voltage, falls below the threshold), the monitoring system may trigger a switch-over. Alternatively, a dynamically determined switch-over threshold may be applied. For example, a voltage offset from a run-time determined voltage, such as the voltage of the battery system at full charge, may be employed as the switch-over threshold. In that case, the voltage offset may be fixed relative to the run-time determination, or may be compensated by various factors including without limitation, loading (or discharge rate), temperature, age of battery (e.g., as measured by a continuously running clock, or the number of discharge cycles detected, revolutions of a drive shaft or other mechanical load, etc.). Also, the switch-over threshold itself may be a static voltage and/or voltage slew-rate (i.e., rate of voltage change) or more generally, any useful measure of the discharge level of a battery cell or group of battery cells. Finally, any of the foregoing techniques for triggering switch-over may be run-time or programmatically selected according to operating conditions, battery age and/or application needs, including transitioning from one switch-over trigger to another upon detecting a change in operating conditions or loading.

Because the discharge profile of a rechargeable battery tends to change as the battery ages, it is desirable to occasionally re-calibrate a battery's maximum run time in a single discharge cycle and thus provide a more accurate capacity estimation as the battery wears. In one embodiment, such capacity calibration may be performed on regular event intervals or time intervals, for example, after a predetermined number of discharge cycles or elapsed time. In general, capacity calibration involves discharging the battery from a fully charged state to a relatively complete discharge state in which the output voltage drops significantly below the normal operating voltage (e.g., a predetermined voltage beyond the maximum run-time line 105 of FIG. 1). Because the battery system will eventually be unable to drive the load at some point during the capacity calibration, such calibration operations are generally performed in conventional battery systems when the battery is not in active duty. In the case of an electric automobile, for example, such calibration essentially amounts to running out of fuel; an operation that would generally be undertaken at a service station to avoid stranding the vehicle operator. This limitation is overcome by the split battery system proposed herein. More specifically, the CSBS remains available even after the OBS is discharged, thereby enabling the OBS to occasionally be completely discharged (or at least discharged to a deterministic level) and thus calibrated during normal operating conditions. In the case of an electric vehicle, for example, the calibration event may be signaled to the vehicle operator or rendered entirely without operator knowledge.

Figure 3:
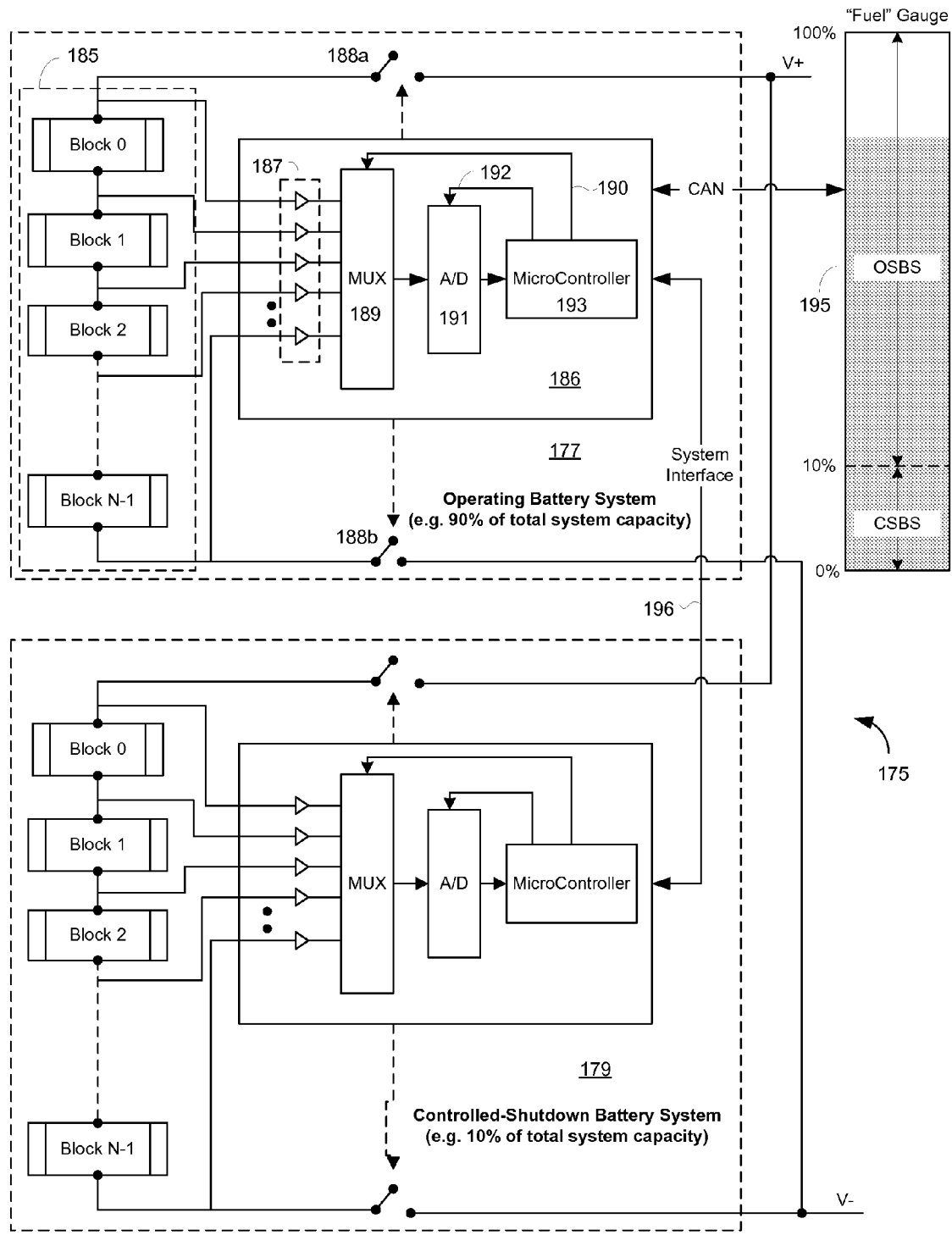
FIG. 3 illustrates an embodiment of a split rechargeable-battery system in greater detail, showing an operating battery system and controlled-shutdown battery system as well as a "fuel" gauge intended to show the remaining capacity of the overall battery system at a given time.

FIG. 3 illustrates an embodiment of a split rechargeable-battery system 175 in greater detail, showing an operating battery system 177 and controlled-shutdown battery system 179 as well as a "fuel" gauge 195 intended to show the remaining capacity of the overall battery system (the OBS and CSBS, collectively) at a given time. The fuel gauge may be omitted if unnecessary in a given application. Also, separate gauges or other indicators may be presented for each battery subsystem.

For ease of explanation, the OBS 177 and CSBS 179 are shown as having an identical implementation, including a number (N) of blocks of recharge-able battery cells 185 (e.g., each block containing some number of parallel-coupled rechargeable battery cells, like lithium-ion cells according to 18650 or other form factor), load switches 188a/188b and battery control unit 186. In alternative embodiments, the OBS or CSBS or both may have different configurations, numbers of blocks of cells, or numbers of cells per block. Also, a single battery control unit (with or without redundancy) may be provided to monitor all the battery subsystems.

Referring to the OBS 177, the cell-blocks 185 are coupled in series between the load switches (e.g., semiconductor or relay-throw elements, or any other elements that enables signal controlled transition between open and closed connection at the switch poles), which are in turn switched to an open or closed (discontinuous or continuous) state according to an output from the control unit. When the load switches are closed, the OBS cell-blocks are enabled to deliver power to a load via output terminals, V+, V− (which correspond to the "main" terminals of FIG. 1), and when the switches are open, the OBS is shut off or disabled from driving the load. By this arrangement, and because the CSBS has a similar switchable connection to the load, the OBS may be switched out (decoupled from the load) at some point during its discharge cycle, and the CSBS switched in via its own load switches to provide a dependable amount of reserve power.

In the embodiment shown, the control unit 186 within the OBS (and the CSBS) includes a microcontroller 193, analogto-digital converter 191, multiplexer (or selector) 189 and signal-conditioning elements 187. Any or all of these components may be integrated onto a single integrated-circuit device (e.g., an application-specific integrated circuit) or implemented as discrete elements within the control unit. The microcontroller executes a pre-loaded program (e.g., burned into non-volatile memory within the microcontroller itself or another storage within or separate from the control unit) to read, in round-robin fashion, the individual voltage potential of each block of cells, determine based on those readings (or measurements) whether a switch-over threshold has been reached and if so, effect a switch-over to the CSBS. To this end, the micro-controller outputs a selection signal 190 that sequences the multiplexer 189 through selection of each of the pre-conditioned cell-block voltages in turn, triggering a sequence of analog-to-digital operations within A/D converter 191 (via enable signal 192) to obtain a digitized representation of each cell-block voltage. Note that pre-conditioning is entirely optional, but that conditioning elements 187 may include, for example, amplification or filtering of any sort.

If the micro-controller 193 determines that a switch-over threshold has been reached, the micro-controller opens the OBS load switches, and notifies the control unit for the CSBS of the switch-over via system interface 196. The CSBS control unit responds to the switch over by closing its load switches to enable the CSBS battery cells to drive the load. The CSBS control unit additionally begins (or continues) monitoring the CSBS voltages and reporting those voltages to the OBS control unit (e.g., via system interface 196) which in turn, drives the fuel gauge 195. In one embodiment, the OBS control unit may additionally signal the operator that a switch-over has occurred (e.g., by displaying an indicator on the fuel gauge 195 indicating that the system is under reserve power or down to a remaining percentage capacity (e.g., 10% in this example).

Still referring to FIG. 3, the battery control units within the OBS and CSBS may additionally monitor load current (or other indicator of battery discharge) to enable a determination of the total amount of energy delivered to the load and thus to approximate the consumption of charge on the fuel gauge. Such discharge measurements may also be used in a capacity calibration operation as discussed below.

Figure 4:
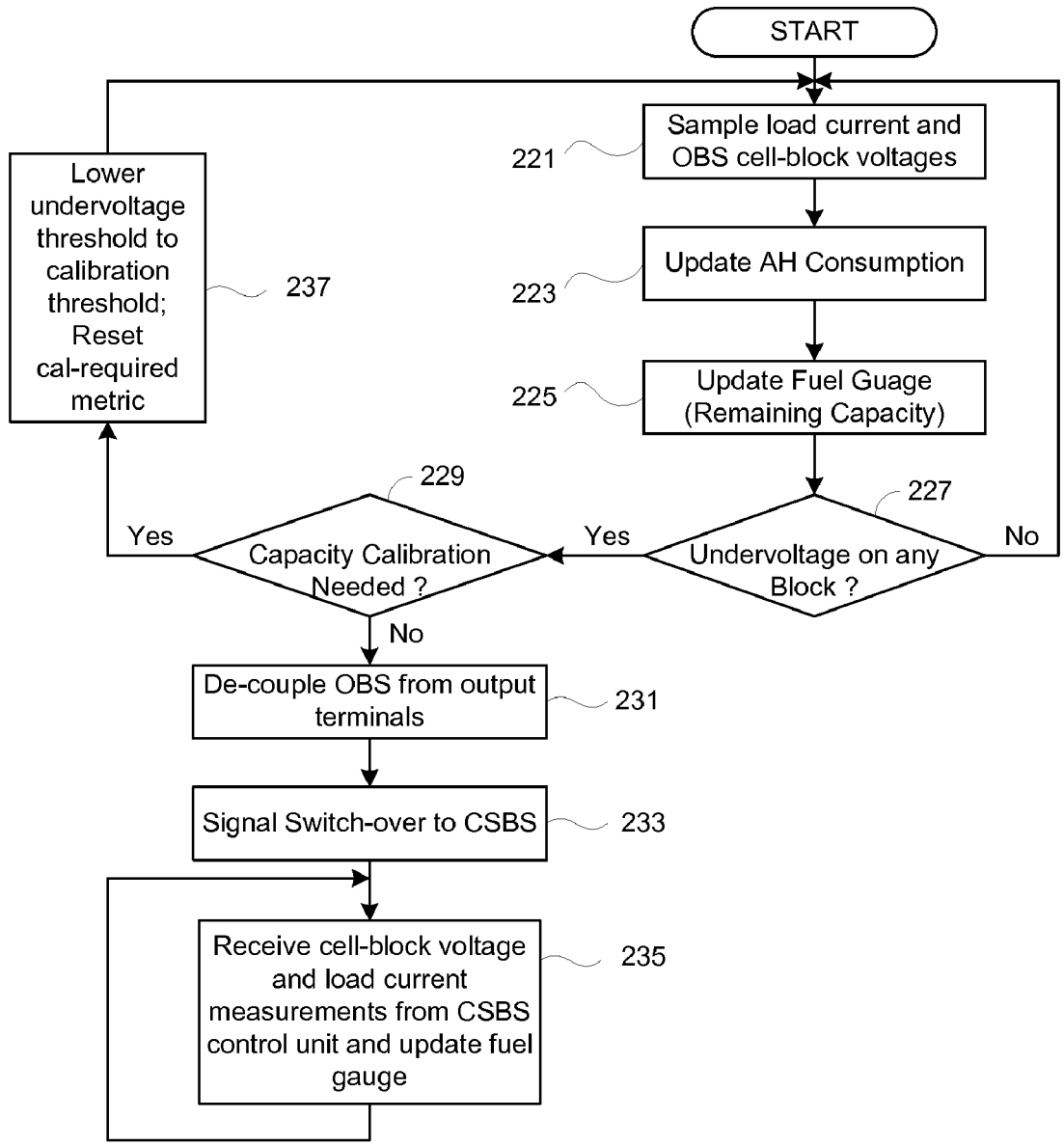
FIG. 4 is a flow diagram of operations carried out by a battery control unit for the operational battery system in one embodiment.

FIG. 4 is a flow diagram of operations carried out by the OBS control unit in one embodiment. As shown the OBS control unit initially samples the load current and all OBS block voltages at 221, then updates the accumulated power consumption (referred to herein as amp-hour (AH) consumption) at 223 and updates the fuel gauge at 225 by subtracting the AH consumption from a previously calibrated, total capacity value. So long as none of the cell-block voltages are undervoltage (determined in decision block 227), the OBS control unit continues to execute the monitoring and update operations shown at 221, 223 and 225. In the embodiment shown, if any of the cell-block voltages is determined to be undervoltage, the control unit next determines whether a capacity calibration is needed at decision block 229. As discussed above, numerous predetermined or dynamically determined undervoltage thresholds may be used, and undervoltage may be determined in whole or part based on a group of blocks or even all the blocks collectively rather than based on the voltage for an individual block. Similarly, with regard to the need for capacity calibration, the OBS control unit may, for example, track the number of times an under-voltage condition has been reached within the OBS (i.e., number of discharge cycles) and/or elapsed time since last capacity calibration was carried out, determining that a calibration is needed if either of those metrics exceed a predefined or programmed threshold. Each pass through the monitoring-and-update loop (i.e., as shown at 221, 223, 225, 227) may be triggered on regular intervals (e.g., by expiration of a counter within the microcontroller 193 or operation of other timing circuitry), to enable incremental power consumption to be determined.

In one embodiment, if a capacity calibration is needed, the OBS drops the undervoltage threshold to a deep discharge level and then continues the monitoring-and-update loop effected by operations 221, 223, 225, 227. By this operation, the OBS control unit effectively retains the OBS as the system power source until the deep discharge threshold is reached and, at that point, applies the total amp-hours consumed during the overall discharge cycle to update the capacity of the OBS and thus the overall battery system.

If no capacity calibration is needed, the OBS control unit de-couples the OBS from the battery-system output terminals at 231, signals the switch-over to CSBS at 233 (i.e., notifying the CSBS controller and thus enabling the CSBS to be coupled to the output terminals to drive the load), and then begins receiving cell-block voltage and load current measurements from the CSBS control unit and updating the fuel gauge (and total amp-hour consumption) accordingly at 235.

Figure 5:
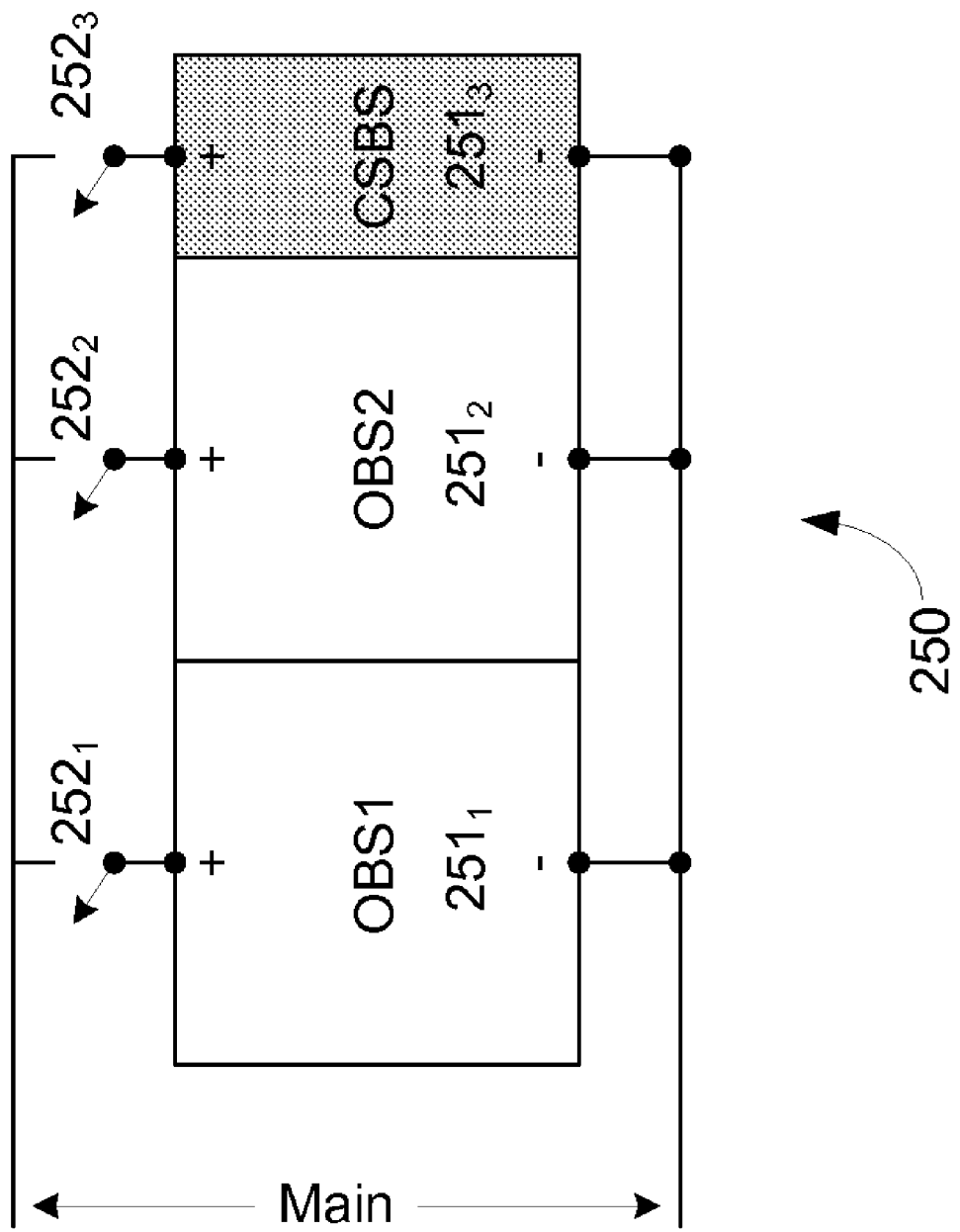
FIG. 5 illustrates an alternative embodiment of a split rechargeable-battery system in which the split battery concept of FIG. 2 is extended further by splitting at least the operational battery system into multiple battery subsystems and alternating or sequencing their use in respective portions of an operating cycle and/or switching in one or more additional subsystems when more power is required.

FIG. 5 illustrates an alternative embodiment of a split rechargeable-battery system 250 in which the split battery concept of FIG. 2 is extended further by splitting the operational battery system (OBS) into N battery subsystems and alternating their use upon operating cycles and/or switching a subsystem in when more power is required (e.g., using a HV diode to equalize voltage). For this purpose, the first N−1 equal-sized battery systems may be designated as Operating Battery System 1 (OBS1) thru Operating Battery System N−1 (OBSN−1) while the remaining smaller Nth end-of-operating cycle battery subsystem is designated as the Controlled-shutdown Battery System (CSBS). The specific embodiment of FIG. 5 presents a high-level reference design architecture for a 3-part Rechargable Split Battery System (RSBS) formed by OBS1, OBS2 and CSBS (i.e., 2511, 2512 and 2513) each of which is coupled to the battery output terminals ("Main") by respective switch elements 2521, 2522, 2523.

During operation, each of the rechargeable battery subsystems may be applied in succession to power a load, switching over from OBS 1 to OBS2 and then to CSBS as each subsystem reaches a depletion point (i.e., switch-over point). This approach may be extended, splitting (or dividing or partitioning) the battery system into any practical number of battery subsystems, each of which may be applied in succession as a previous subsystem reaches a switch-over point. Further, the CSBS may be undifferentiated from the operational battery subsystems, except to act as the last of the battery subsystems to be applied and thus the final reserve in the overall operating capacity. Finally, there is no specific requirement that all or any of the battery subsystems be equal-sized.

One potential disadvantage of the split battery system of FIG. 5 is that the smaller operating size of the individual battery subsystems results in faster discharge of each subsystem. As can be see from the above Voltage/Capacity diagram of FIG. 1, this increased discharge rate may skew the ability to estimate remaining electrical charge. What is not shown in FIG. 1 is that frequent high discharge also reduces the life of the battery system. Thus, a significant advantage of the split battery concept is that each battery system may be charged more often from a known discharge state than would normally be the case where the battery was operated only nominally a majority of the time. For this reason, the battery system may be designed to operate on any combination of the three battery systems to allow the user or the battery system controller the ability to intelligently provide power as needed to the device without needless high discharge while still allowing for battery charge calibration. That is, all the battery subsystems may be ganged to effect a unified battery system, the battery subsystems may be partially ganged to effect the split battery subsystem of FIG. 2, or the battery subsystems may be applied individually, all in response to dynamically determined power demands.

In one embodiment, a battery control unit similar to the battery control units described in reference to FIG. 3 is provided with each battery subsystem (OBS 1-OBSN and CSBS) and enables a coordinated switch-over from one subsystem to the next. A supervising one of the control units (e.g., the control unit for OBS1) may additionally determine when the instantaneous power demanded by the operator (or load) exceeds the power delivery capability of a single subsystem and instruct the subsystem control units for one or more others of the battery subsystems to engage (i.e., couple their respective batteries to the load, for example, by closing load switches as described above) thereby ganging two or more of the battery subsystems to meet the power demand. To avoid inrush current from one battery subsystem to another, high-voltage diodes may be use to equalize the voltages as two battery subsystems initially switched in parallel to the load terminals. Thereafter, as power demand falls off, the supervising control unit may instruct the control units of the ganged battery subsystems to disengage accordingly. Continuing the example of an electric vehicle, the control circuitry may engage only one of the battery subsystems when the vehicle is not accelerating and traveling at a moderate or slow speed (i.e., during relatively low power demand), but may engage one or more additional battery subsystems when the operator demands acceleration (e.g., presses the "gas" pedal) or the vehicle is operating at high speed.

A split battery system with multiple battery subsystems provides another advantage. Because frequent deep discharge tends to reduce the overall life a rechargeable battery (i.e., deep discharge tends to speed the cycle-to-cycle decline in total capacity), it is often desirable to charge a battery from a predefined discharge state, such as the state indicated by the vertical dashed line 107 in FIG. 1, well before it reaches the maximum run time. In a split battery system with multiple sections, an overall battery control unit (or combination of battery control units for the individual battery subsystems) may alternate use of different battery subsystems. For example, the control unit may engage each battery subsystem sequentially, switching to the next battery subsystem when the currently-engaged subsystem has reached the predefined discharge state.

While the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. A battery system comprising:
   output terminals;
   an operating battery subsystem switchably coupled to the output terminals and having a first plurality of battery cells;
   a controlled-shutdown battery subsystem switchably coupled to the output terminals and having a second plurality of battery cells, the second plurality being substantially less than the first plurality; and
   a control unit to dynamically determine a switch-over threshold that corresponds to a rate of change of voltage across the output terminals, the control unit additionally to determine when the operating battery subsystem has reached the switch-over threshold and, in response, to decouple the operating battery subsystem from the output terminals and to couple the controlled-shutdown battery subsystem to the output terminals, wherein the switch-over threshold is programmable and wherein the control unit comprises a first battery control unit to monitor the operating battery subsystem, and a second battery control unit to monitor the controlled-shutdown battery subsystem.

2. The battery system of claim 1 further comprising a battery pack, and wherein the operating battery subsystem and controlled-shutdown battery subsystem are included within the battery pack.

3. The battery system of claim 1 wherein the control unit monitors discharge of the operating battery subsystem in part by measuring a voltage of the operating battery subsystem.

4. The battery system of claim 1 wherein control unit dynamically determines the switch-over threshold based, at least in part, on one or more of the following factors: (A) a load on the operating battery subsystem, or (B) a temperature of the operating battery subsystem.

5. The battery system of claim 1 wherein the control unit comprises a programmable processor to determine the switch-over threshold.

6. The battery subsystem of claim 1 wherein the control unit includes circuitry to adjust the switch-over threshold according to a number of discharge cycles of the operating battery subsystem.

7. A method of operation within a battery system, the method comprising:
   switchably coupling an operating battery subsystem to output terminals of the battery system to deliver power to a load;
   dynamically determining a switch-over threshold that corresponds to a rate of change of voltage across the output terminals;
   determining that the operating battery subsystem has reached the switch-over threshold;
   decoupling the operating battery subsystem from the output terminals in response to determining that the operating battery subsystem has reached the switch-over threshold;
   coupling a controlled-shutdown battery subsystem to the output terminals in response to determining that the operating battery subsystem has reached the switch-over threshold, the controlled-shutdown battery system having substantially fewer battery cells than the operating battery subsystem; receiving a value representative of switch-over threshold and storing the value in a programmable register of the battery system to set the switch-over threshold; and monitoring the operating battery subsystem in a first battery control unit and monitoring the controlled-shutdown battery subsystem a second battery control unit.

8. The method of claim 7 wherein the operating battery subsystem and controlled-shutdown battery subsystem are included within the battery pack.

9. The method of claim 7 wherein determining that the operating battery subsystem has reached the switch-over threshold comprises monitoring discharge of the operating battery subsystem in part by measuring a voltage of the operating battery subsystem.

10. The method of claim 9 wherein monitoring discharge of the operating battery subsystem in part by measuring a voltage of the operating battery subsystem comprises executing a sequence of program instructions within a programmable processor.

11. The method of claim 7 wherein determining the switch-over threshold comprises determining the switch-over threshold based, at least in part, on one of the following: a load on the operating battery subsystem, or a temperature of the operating battery subsystem.

12. The method of claim 7 further comprising receiving a value representative of the switch-over threshold and storing the value in a programmable register of the battery system.

13. The method of claim 7 further comprising adjusting the switch-over threshold according to a number of discharge cycles of the operating battery subsystem.

14. A battery system comprising:
first and second groups of battery cells, the first group including more battery cells than the second group;
means for switchably coupling the first group of battery cells to output terminals of the battery system to deliver power to a load;
means for dynamically determining a switch-over threshold that corresponds to a rate of change of voltage across the output terminals;
means for determining that the first group of battery cells has reached the switch-over threshold;
means for decoupling the first group of battery cells from the output terminals in response to determining that the first group of battery cells has reached the switch-over threshold; and
means for coupling the second group of battery cells to the output terminals in response to determining that the first group of battery cells has reached the switch-over threshold, wherein the switch-over threshold is programmable, wherein the means for determining that the first group of battery cells has reached the switch-over threshold comprises a first battery control means to monitor the first group of battery cells, and wherein the battery system comprises a second battery control means to monitor the second group of battery cells.

* * * * *